United States Patent [19]

Morris et al.

[11] Patent Number: 5,005,805
[45] Date of Patent: Apr. 9, 1991

[54] LIFT-TURN VALVE AND ACTUATOR ASSEMBLY

[75] Inventors: Gene A. Morris, New Caney; Deepak C. Patel; James E. Sternenberg, both of Houston, all of Tex.

[73] Assignee: Daniel Industries, Inc., Houston, Tex.

[21] Appl. No.: 532,625

[22] Filed: Jun. 4, 1990

[51] Int. Cl.⁵ .................. F16K 5/18; F16K 25/00; F16K 31/528
[52] U.S. Cl. .................. 251/229; 74/22 R; 74/23; 74/57; 74/89.14; 74/107; 251/163; 251/188; 251/249.5; 251/252
[58] Field of Search .............. 251/56, 58, 162, 163, 251/188, 229, 248, 249.5, 252, 203; 74/22 R, 23, 25, 57, 89, 89.14, 89.15, 107, 424.8 R, 424.8 VA

[56] References Cited

U.S. PATENT DOCUMENTS

| | | | |
|---|---|---|---|
| 2,791,395 | 5/1957 | Prescott | 251/162 |
| 3,492,880 | 2/1970 | Pearson | 251/58 |
| 3,793,893 | 2/1974 | Heinen | 251/229 |
| 4,061,115 | 12/1977 | Predhome, Jr. | 74/57 |
| 4,120,479 | 10/1978 | Thompson, Jr. | 251/58 |
| 4,234,157 | 11/1980 | Hodgeman et al. | 251/229 |
| 4,293,117 | 10/1981 | Mueller | 251/252 |
| 4,350,322 | 9/1982 | Mueller | 251/229 |
| 4,436,280 | 3/1984 | Geisow | 251/252 |
| 4,666,124 | 5/1987 | Giacobbi | 251/252 |

FOREIGN PATENT DOCUMENTS

| | | | |
|---|---|---|---|
| 468270 | 9/1950 | Canada | 251/252 |
| 1147569 | 11/1957 | France | 251/162 |

Primary Examiner—George L. Walton
Attorney, Agent, or Firm—James L. Jackson

[57] ABSTRACT

A lift-turn valve actuator is provided for tapered plug valve and slip assemblies that accomplishes vertical movement of the plug and retraction of the slips from sealing engagement with the valve body prior to rotation of the plug member 90° to its open position. The valve actuator assembly includes inner fitting inner and outer sleeve members each having cam slots formed therein with the cam follower of a valve actuating stem being engaged with both cam slots. Rotation of the outer sleeve member with respect to the static inner sleeve imparts initial vertical movement to the actuator stem, valve stem and valve plug for slip retraction as an initial component of movement followed by simultaneous rotational and upward movement of the plug member until the plug member has rotated 90° to its open position. The cam slots further secure the follower of the actuator pin so that the plug member will not have the possibility of downward or counterrotational movement until the outer sleeve member is rotated in the opposite position for closure and sealing.

13 Claims, 3 Drawing Sheets

LIFT-TURN VALVE AND ACTUATOR ASSEMBLY

FIELD OF THE INVENTION

This invention relates generally to valves for controlling the flow of fluid in conduit systems and more specifically relates to lift-turn type rotary plug valves incorporating cam energized slip assemblies for mechanically enhancing sealing. More particularly, this invention is directed to a valve actuator mechanism having cam surfaces forming cam slots that interact with a cam follower during relative rotational movement of the cams to control lifting and rotation of a plug and slip assembly of the valve mechanism so that the slip members are positively unseated within the valve body prior to rotation of the plug and slip assembly to the open position of the valve.

BACKGROUND OF THE INVENTION

Of the various types of valves utilized for controlling the flow of fluid within conduit systems, rotary plug valves have been found to be quite popular. Rotary plug valves are typically of compact design when considered in comparison with many other types of valves having substantially the same flow passage dimension where physical size and height is an important or mandatory design consideration. Rotary plug valves such as tapered plug valves and ball valves are widely used. Rotary plug valves are typically of simple nature, utilizing few moving parts and are of nominal cost, and these features substantially enhance the competitive nature of plug valves.

Among the disadvantages of rotary plug valves, however, are the disadvantages of operational pressure range and sealing capability. Most rotary plug valves function properly only at relatively low pressure ranges, for example in the order of 0-150 psig. This operational pressure restriction, in many flow systems, requires that other, less desirable, more expensive but higher pressure valves be utilized. Where plug valves incorporate lubricant enhanced sealant, additional sealing must be introduced into the sealant chambers quite often to insure against leakage. This requirement is an expensive service consideration which is frequently detrimental to the employment of such valves. Also, the lubricant sealant must be compatible with the product controlled by the valve because a small amount of the sealant becomes lost into the flow stream.

In may cases, elastomeric sealing material is incorporated in the plug valve mechanism for establishment of a seal between the rotatable plug and the sealing surfaces of the valve body. The elastomeric sealing material tends to wear at a rapid rate, especially in valves of larger size, and therefore presents a problem from the standpoint of servicing, especially if the valve is intended for frequent cycling during use.

To gain the advantages of reasonably high operational pressure and extended service life of sealing material, plug valves have been developed that incorporate mechanically enhanced sealing. In one type of valve mechanism for this purpose, (known as a "lift-turn" plug valve) a rotatable plug element having a flow port formed therein is formed to define external interlocking connections and tapered cam surfaces that mate with interlocking connections and cam surfaces defined by a pair of opposed slip elements. The slips incorporate sealing elements, typically of the molded elastomeric or resilient type, and in the closed position of the plug member, establish sealing engagement with sealing surfaces defined within the valve body as the plug member is moved linearly within the valve body. The cooperating cam surfaces of the tapered plug member and the slips are operative to induce lateral movement of the slips to and from sealing engagement within the valve body. A valve actuator typically parts vertical movement to a valve stem and a cam follower of the actuator typically transverses an L-shaped groove to control linear and rotational movement of the valve stem and plug member. U.S. Pat. No. 3,793,893 of Heinen and 3,046,802 of Cupedo are representative of lift-turn valve actuators of this type. U.S. Pat. No. 4,234,157 of Hodgeman, et al., commonly assigned herewith is also generally representative of a lift-turn valve actuator for tapered plug valves having slip assemblies for high pressure sealing capability. In these types of high pressure rotary plug valves, seal life is materially enhanced due to lateral movement of the slips into direct sealing engagement with the seating surfaces within the valve body and the camming activity that occurs between the plug and slips as the plug is moved linearly while the slips are restrained from linear movement. High pressure service capability is therefore promoted by cam induced mechanically enhanced sealing.

In rotary plug valves with slip sealing assemblies, in the open position of the valve it is desirable that the sealing slips with their resilient seals be disposed in spaced, protected relation with the inner surfaces of the valve body and also protected from the flow stream. During rotation of the plug and slip assembly for opening and closing of the valve, it is appropriate that the sealing surfaces of the slips be maintained in spaced relation with the internal sealing surfaces of the valve body so that seal erosion will not occur during plug rotation. After the plug member has been rotated to its closed position with its flow port disposed in transverse relation to the flow passages of the valve, the sealing surfaces of the slips are then moved laterally into direct sealing engagement with the internal sealing surface of the valve body about the flow passages without any rotation of the plug member. This feature permits the establishment of effective sealing capability even under high pressure conditions without inducing any mechanical erosion of the seal members while closure and sealing of the valve mechanism is being accomplished. The reverse is true upon opening of the valve mechanism. The plug member is moved vertically by the valve actuator thereby inducing the interacting cam surfaces of the plug member and slips to retract the slips directly from sealing engagement with the sealing surfaces within the valve body prior to rotation of the plug and slip assembly to its open position. As the valve is being opened initial upward movement of the plug member induces retraction of the slips. The upstream slip will be forced inwardly toward the plug member and away from its sealing relation with the valve body by upstream pressure and flow of fluid. The downstream slip, however, will maintain its sealed relationship with the sealing surface of the valve body by the force that is developed by the pressure differential that exists across the downstream slip. Further vertical movement of the tapered plug member together with restraint of vertical slip movement by the valve body structure, induces inward, retracting movement of the downstream slip until its seal with the body surfaces is broken, thereby permitting limited flow to the downstream flow passage but materially decreasing the pressure differential across the downstream slip. With both of the slips retracted positively clear from the internal sealing surfaces of the body, the plug member and slips may then be rotated in unitary fashion to the open position, thereby bringing the flow port of the tapered plug into proper registry with the flow passages of the valve body.

In the closed position of a high pressure plug valve of this type, double block and bleed sealing can be accomplished by venting the valve chamber. When this is done, any leakage across either the upstream or downstream seals of the slips will be capable of detection.

As mentioned above, many valve actuators for lift-turn type plug valves accomplish rotation of the plug member between its open and closed positions in response to linear movement of the valve stem by a stem actuator that imparts linear movement to the stem. I is desirable, therefore, to provide a valve actuator for lift-turn type plug valves, especially those with cam energized slip assemblies for high pressure sealing capability, wherein linear movement of a valve stem is accomplished in response to rotary movement of a valve actuator component and the resulting valve and actuator assembly will be of limited height.

SUMMARY OF THE INVENTION

It is a primary feature of the present invention to provide a novel valve actuator assembly for a lift-turn type plug valve, especially plug valves having plug and slip assemblies with valve opening actuation being accomplished by lifting movement followed by rotational movement and valve closing actuation being accomplished in reverse manner.

It is also feature of the present invention to provide a novel valve actuator mechanism for lift-turn plug valves wherein both lifting and rotational movement of the plug valve mechanism is accomplished through simple rotary movement of a rotary component of the valve actuator mechanism.

It is an even further feature of this invention to provide a novel valve actuator mechanism for lift-turn plug valves wherein a pair of relatively rotatable valve actuator sleeves that are each provided with pairs of opposed cam surfaces defining cam slots or guide slots therein, which cam surfaces cooperatively engage opposed followers of a valve actuator stem and induce movement to the follower and valve stem having an initial component of linear movement followed by a component of rotary movement for accomplishing valve slip unseating from the closed position and rotation of the plug and slip assembly to the open position.

It is another feature of the present invention to provide a novel actuator mechanism for lift-turn type plug valves wherein balanced forces are applied by the valve actuator mechanism to an actuator stem to which the valve stem is connected, thus permitting overstressing and excessive wear of cam followers or cam surfaces by off-center loads and thus materially extending the service life of the valve actuator mechanism.

It is another feature of this invention to provide a novel valve actuator mechanism for lift-turn plug valves which is of compact design and promotes valve and actuator assemblies of minimal height such as for use in environments having height restrictions.

Other and further objects, advantages and features of the present invention will become apparent to one skilled in the art upon consideration hereof. The form of the invention which will now be described in detail, illustrates the general principles of this invention, but it is to be understood that this detailed description is not to be taken as limiting of the scope and spirit of the present invention.

Briefly, a preferred embodiment of this invention may conveniently take the form of a valve actuator having an inner sleeve defining cam surfaces forming opposed guide slots each having upper and lower vertically oriented sections and an intermediate inclined section. The inner sleeve forms a stem passage within which is received the upper portion of an actuator stem to which the valve stem of the plug valve is connected in non-rotatable relation. An outer sleeve is rotatably disposed about the inner sleeve and defines cam surfaces forming opposed cam slots each having upper and lower inclined sections and a vertically oriented intermediate section. A cam follower extends transversely from opposed sides of the actuator stem and is movably received within the respective guide slots and cam slots of both the inner and outer actuator sleeves. An actuator housing is provided which is secured to the valve body and is provided with a sleeve retainer which substantially prevents linear movement of the outer sleeve but permits rotation of the outer sleeve relative to the inner sleeve. The inner sleeve is disposed in fixed relation with the valve actuator housing and therefore is secured against linear or rotational movement.

The inner sleeve or guide sleeve of the valve actuator apparatus defines a pair of opposed guide slots formed by cam surfaces. These guide slots have upper and lower generally vertically oriented slot sections disposed approximately 90° apart and being interconnected by an inclined slot section. The outer sleeve or cam sleeves form cam surfaces defining opposed lift cam slots, each having a lower inclined slot section and intermediate generally vertical slot section and an upper inclined slot section. An actuator stem is provided which has its upper extremity received within the vertical stem passage of the inner sleeve. The follower means, such as a transversely oriented pin, extends through a bore in the upper portion of the actuator stem with opposed ends of the follower pin being received within the guide and lift cam slots of both the inner and outer sleeves.

A sleeve drive member is keyed to the upper portion of the outer sleeve and is adapted for driving rotation by any suitable drive means such as a worm gear for example. As the outer sleeve is rotated by the drive means, movement is imparted to the follower means and thus to the actuator stem. Since the inner sleeve member is fixed with respect to the actuator body, the follower reacts with the respective cam surfaces of each of the inner and outer sleeves and imparts movement to the actuator stem and to the valve stem and valve plug coupled therewith, such movement having an initial of vertical movement for unseating the slips of the valve followed by a 90° component of rotational movement for rotation of the plug member to its open position. The interactive cam slots also function to secure the follower and thus the actuator stem at the open position of the plug valve by a third component of vertical movement to thus prevent inadvertent counter-rotational movement of the plug member from its open position.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however that the appended drawings illustrate only typical embodiments of this invention and are therefore not to be considered limiting of its scope, for the invention may admit to other equally effective embodiments.

IN THE DRAWINGS

DETAILED DESCRIPTION OF PREFERRED EMBODIMENT

Figure 1:
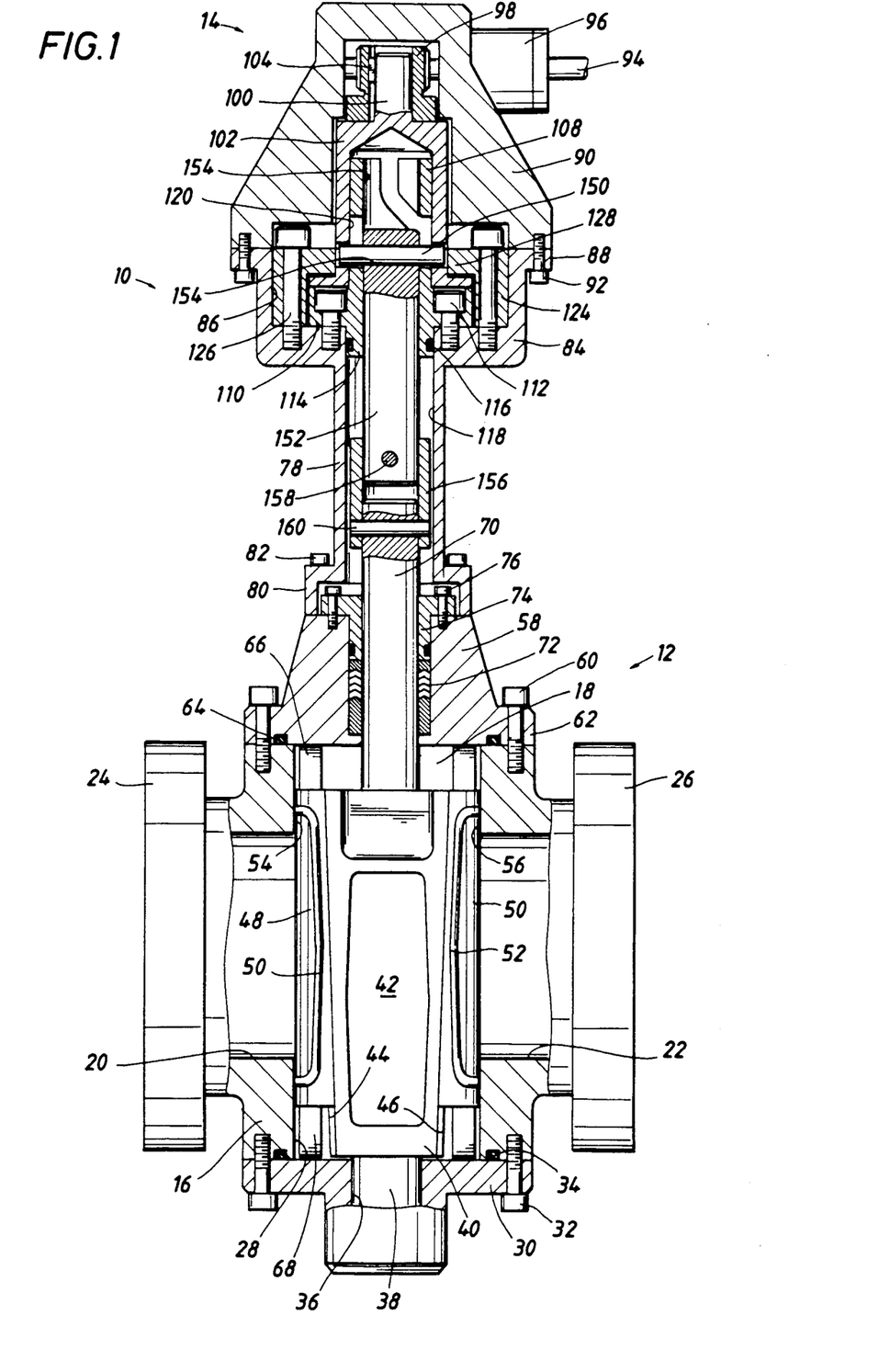
FIG. 1 is a sectional view of a valve and valve actuator assembly with the valve actuator being constructed in accordance with the teachings of the present invention and with the plug valve being shown in its closed position.
Figure 2:
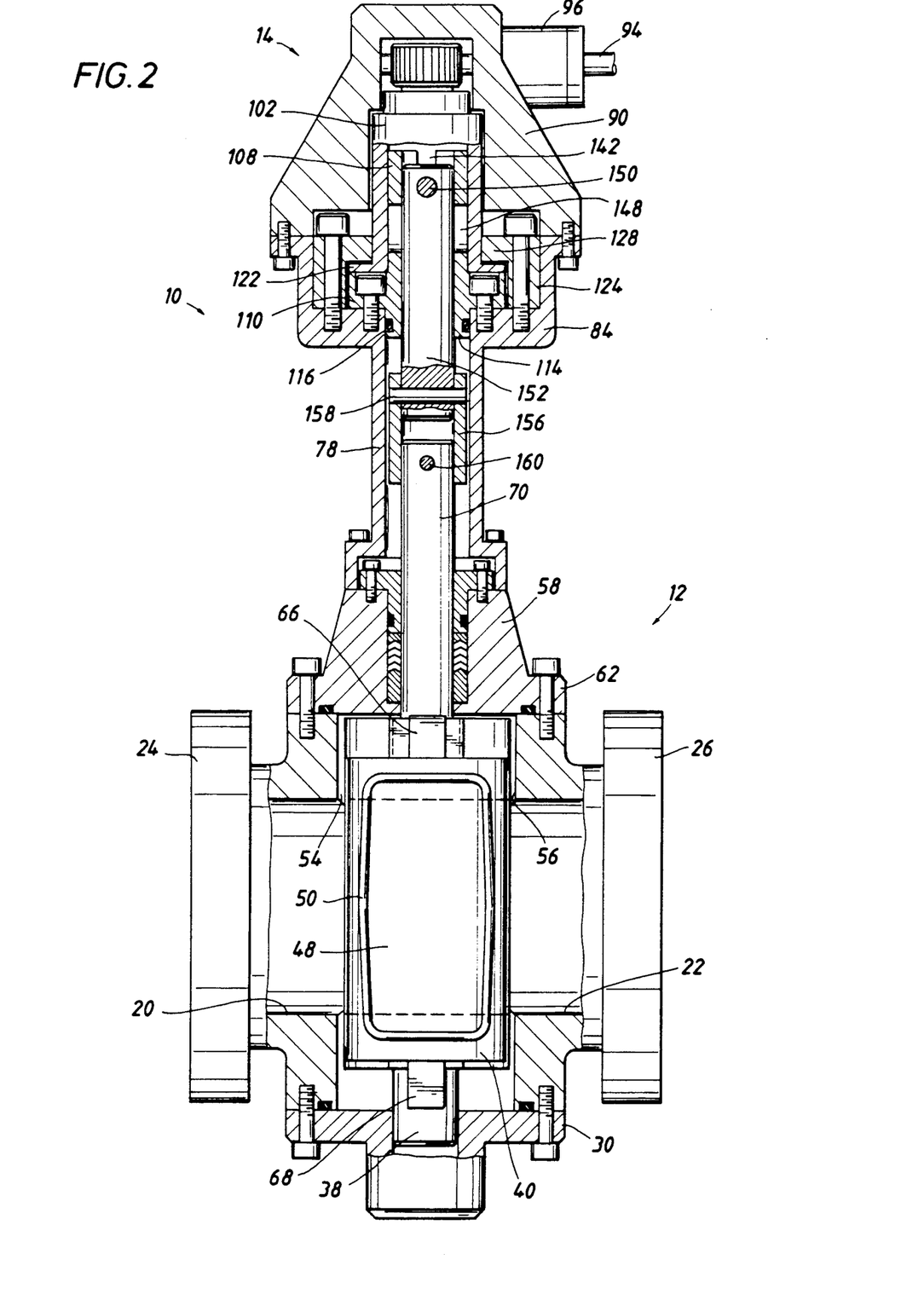
FIG. 2 is a sectional view such as shown in FIG. 1 with the valve actuator and valve being shown in the open position.

Referring now to the drawings and first to FIGS. 1 and 2 a plug valve and valve actuator assembly is illustrated generally at 10 which includes a plug valve shown generally at 12 and a valve actuator illustrated generally at 14. The plug valve 12 is a lift-turn plug valve which includes a valve body 16 forming a valve chamber 18 and having inlet and outlet flow passages 20 and 22 disposed in intersecting relation with the valve chamber. Connection between the valve body and flow conduits controlled thereby may be accomplished by means of connection flange s 24 and 26 which are provided for bolted connection to the respective flanges of the conduits. The valve body structure may also be provided with any other conventional conduit connection structure without departing from the spirit and scope of this invention. The valve body forms a lower opening 28 which is closed by means of a trunnion support plate 30 which is secured to the body 16 by bolts 32 and sealed with respect to the body by a circular sealing element 34. The trunnion support member 30 defines an internal trunnion receptacle 36 in the form of a cylindrical blind bore which receives a trunnion member 38 depending from the lower portion of a tapered plug member 40. The plug member 30 forms a flow port 42 which, in the open position of the valve, is disposed in registry with the inlet and outlet passages 20 and 22 of the valve body to provide for efficient flow of fluid through the valve. In the closed position, as shown in FIG. 1, the flow port 42 is disposed in transversely oriented relation with the flow passages 20 and 22.

At the opposed sides of the plug member 40 is provided dove tailed grooves 44 and 46 which have mating, retained relation with respect to corresponding grooves of a pair of slip members 48 and 50. The slips have sealing elements 50 and 52 respectively that are disposed for sealing engagement with opposed sealing surfaces 54 and 56 that are formed within the valve body and define portions of the inner wall surfaces of the valve chamber 18.

The upper portion of the valve body 16 is closed by means of a bonnet structure 58 which is retained in assembly with the valve body by means of a plurality of bolts 60 that extend through a bonnet flange 62. The bonnet is sealed with respect to the valve body 16 by means of a circular sealing element 64. The inner surfaces of the trunnion support member 30 and the bonnet 58 form stops for upper and lower extensions 66 and 68 of the slip members 48 and 50 to thus restrain the slip members from significant movement along with the tapered plug member 40. Since the dove tailed slots 44 and 46 of the plug 40 are disposed in upwardly diverging relation, upward movement of the plug member 40 relative to the slip members will induce contraction movement to the slip members toward one another. Likewise, downward movement of the plug member 40 relative to the slip members will induce expansion movement of the slip members, urging them into tight sealing engagement with the respective sealing surfaces 54 and 56 of the valve body. To minimize wear on the sealing elements 50 and 52 of the slip members, initial upward movement of the plug member along with its valve stem 70 will induce retraction movement of the slip members, moving them directly away from sealing engagement with the surfaces 54 and 56. After the slip members have been retracted by this initial upward plug movement, the plug member may then be rotated 90° to position the flow port 42 in proper registry with the flow passages 20 and 22. This lift-turn arrangement for valve unseating and rotation assures that the valve will have the capability of high pressure sealing and will also have the capability of block and bleed sealing where the valve chamber is vented in the closed and sealed position of the slips while the flow lines are maintained under pressure. This feature enables detection of any seal leakage that might develop and is thus an important feature from the standpoint of valve maintenance.

The valve stem 70 extends through a passage in the bonnet 58 which is defined in part by a packing assembly 72 which is retained within the stem passage by means of a packing retainer 74 that is secured to the upper portion of the bonnet 58 by means of packing retainer bolts 76.

For adaptation of the valve mechanism 12 for lift-turn actuation either by manually or power energized application of valve opening or closing force, the valve actuator such as shown at 14 is assembled to the upper portion of the bonnet structure 58. A valve actuator tube 78 having a lower flange portion 80 is secured to the upper portion of the bonnet 58 by means of a plurality of bolts 82. At its upper portion the valve actuator tube 78 defines a valve actuator housing 84 forming an internal chamber 86 and an upper connection flange 88. The upper portion of the valve actuator housing is completed by a closure member 90 which is secured in assembly with the housing 84 by means of bolts 92. The closure 90 cooperates with the housing structure 82 to define the valve actuator chamber 86 and is provided with a drive shaft 94 extending through a shaft support boss 96 that is typically formed integrally with the closure member 90. Within the valve actuator chamber 86 the shaft 94 supports a worm gear, not shown, which, upon rotation of the shaft 94, imparts driving rotation to a gear member 98. The gear 98 is in turn coupled in non-rotatable driving rotation with a driven shaft 100 forming the upper end of an outer sleeve member 102 by means of a key 104 positioned within keyways in the gear 98 and shaft 100. Keyway 106 of the shaft 100 is shown in the isometric illustration of FIG. 3.

An inner sleeve member 108 is disposed within the valve actuator housing 86 and is provided with a connection flange 110 which is secured to the valve actuator housing by means of a plurality of sleeve retainer bolts 112. The inner sleeve is provided with a depending projection 114 having a circular sealing element 116 positioned within a circular seal groove therein and establishing sealed relation between the inner sleeve and the inner cylindrical surface 118 of the valve actuator tube 78. The outer sleeve member 102 forms an inner receptacle 120 which receives the upper cylindrical portion of the inner sleeve member in movable relation therein. The outer sleeve member 102 also forms a flange member 122 which extends radially outwardly from the lower portion of the outer sleeve. A sleeve retainer member 124 is secured in fixed relation with the actuator housing 84 by means of a plurality of retainer bolts 126 and defines a radially inwardly extending retainer flange 128 that overlies the flange 122 of the outer sleeve member. The flange 128 permits rotation of the outer sleeve relative to the valve actuator housing but functions to restrain the outer sleeve from axial movement. Since the bolts 112 are countersunk within the flange 110 of the inner sleeve member, the flange 122 of the outer sleeve is restrained in one axial direction by the upper substantially planar circular surface 130 of the flange 110 and is restrained in the upward direction by means of the inwardly extending retainer flange 128.

Figure 3:
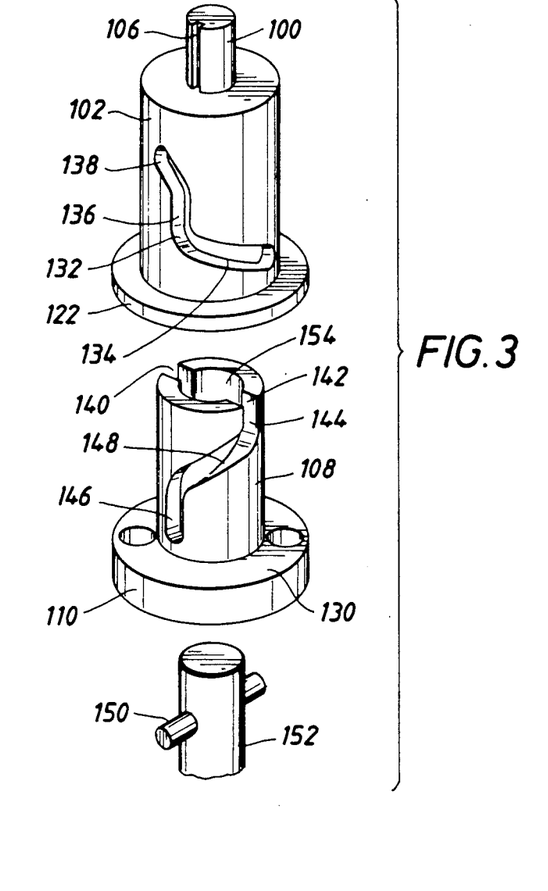
FIG. 3 is an exploded isometric illustration of the inner and outer cam sleeves and the upper portion of the actuator stem of the valve actuator assembly of FIGS. 1 and 2.

The outer sleeve member 102 is formed to define a pair of opposed cam slots 132 each having an inclined lower slot section 134 and intermediate generally vertically oriented slot section 136 and an inclined upper slot section 138. Likewise, the inner sleeve member 108 defines a pair of opposed cam slots 140 and 142 each having upper and lower slot sections 144 and 146 which are offset by 90° and which are in registry with an inclined intermediate slot section 14B. The opposed wall surfaces of the cam slots of the inner and outer sleeve members define cam surfaces that are engaged by cam follower means 150 of a valve actuator stem 152. The inner sleeve member 108 forms an internal stem passage 154 which receives the upper end of the valve actuator stem 152. The follower means 150 may conveniently take the form of a pin member which is received within a transverse bore 154 that is provided at the upper end of the valve actuator stem. For establishment of connection between the valve actuator stem 152 and the valve stem 70 a coupling member 156 is provided which receives the respective stems and is coupled in non-rotatable relation therewith by means of transversely extending ends 158 and 160.

The follower pin 150 is of sufficient length that its end portions are received within the respective cam slots of both the inner and outer sleeve members as shown in FIG. 1. Thus, the follower pin is operationally reactive with the cam surfaces defined by both of the cam slots in order to impart controlling movement to the actuator stem 152 and thus the plug stem 70 and the plug member. Since opposed cam surfaces react simultaneously with opposed ends of the follower pin, forces are applied in balanced manner to the actuator stem. This feature materially enhances the service life of the valve actuator mechanism.

Figure 4:
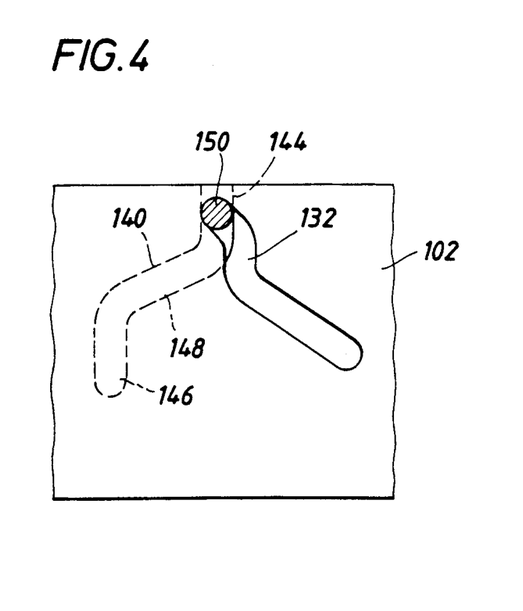
FIG. 4 is an operational illustration in diagrammatic form of the cam follower and cam slots of the inner and outer sleeves, illustrating the position of the follower at the open position of the valve member.
Figure 5:
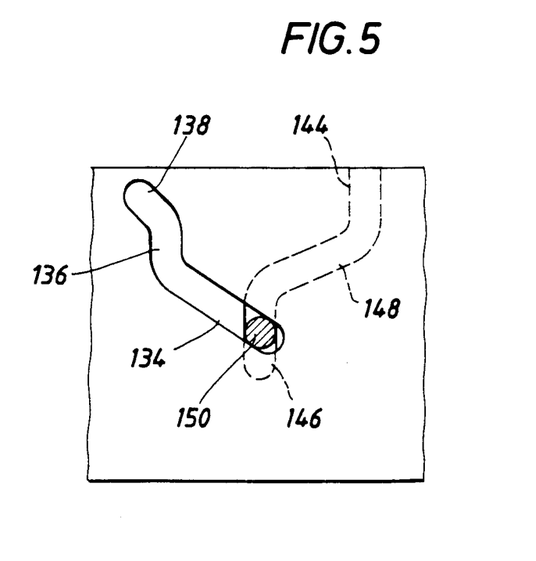
FIG. 5 is a diagrammatic illustration similar to that of FIG. 1 illustrating the relative positions of the actuator stem follower with respect to the cam slots of the inner and outer sleeves in the closed position of the valve.

With reference now to the diagrammatic illustrations of FIG. 4 and 5, the cam slots 132 of the outer sleeve member 102 are illustrated in full line while the guide slots 140-142 of the inner sleeve member are illustrated in broken lines. The relative positions of the guide and cam slots of the inner and outer sleeve members therefore control the position of the cam follower pin member 150. FIG. 4 illustrates the position of the cam follower pin and the guide and cam slots of the inner and outer sleeves at the open position of the plug member 40 while FIG. 5 illustrates the position of the guide and cam slots and the cam follower pin at the close position of the valve plug 40. In correspondence, it is pointed out that FIG. 1 illustrates the closed position of the lift-turn plug valve and the valve actuator assembly while FIG. 2 illustrates the open position of the valve and the position of the valve actuator assembly when the valve is open.

OPERATION

Closing Movement

With regard to FIG. 4 with the valve plug 40 in its open position the follower pin will be positioned within the upper vertically oriented portion 144 of the guide slots of the inner valve and will be positioned in the upper inclined slot section 138 of each of the guide slots of the outer sleeve. As mentioned above, the inner sleeve member is restrained against both rotational and vertical movement by virtue of its bolted assembly to the valve actuator housing 84. Thus, with the inner sleeve member in static position, rotation of the outer sleeve member 102 in the clockwise direction will induce the follower pin to be moved from the inclined upper cam slot section 138 of the outer sleeve to the vertically oriented cam slot section 136. This movement will induce downward movement of the follower pin 150 within the vertically oriented slot sections 144 of the guide slots of the inner sleeve. Upon reaching the vertically oriented section of the cam slots of the outer sleeve, the follower pin will also have reached the intermediate inclined guide slot section 148 of the inner sleeve 108.

Further rotational movement of the outer sleeve member in this same clockwise rotational direction will cause the cam follower 150 to traverse the inclined section 148 of the guide slots of the inner sleeve and simultaneously be moved downwardly within the vertically oriented slot section 132 of the cam slots of the outer sleeve. Further continued clockwise rotation of the outer sleeve member will cause the follower pin to enter the inclined section 134 of the cam slots of the outer sleeve and simultaneously initiate downward movement of the follower pin within the lower vertically oriented section 146 of the guide slots of the inner sleeve. Clockwise rotation of the outer sleeve continues until the follower pin has been driven downwardly to the position shown in FIG. 5, at which position the plug member 40 has moved downwardly sufficiently for its camming activity with the slip member 48 and 50 to force the slips into proper sealing engagement with the sealing surfaces 54 and 56.

Opening Movement

Opening movement of the plug valve 12 is induced by the valve actuator mechanism as follows. From the closed position shown in FIG. 5 and also illustrated in FIG. 1, the outer sleeve member 102 is rotated counterclockwise, or to the right as shown in FIG. 5, thus causing the inclined section 134 of the cam slot of the outer sleeve to react with the follower pin 150 thus forcing the follower pin upwardly. During such upward movement of the follower pin, its rotation is restrained by the vertically oriented slot sections 146 of the guide slots of the inner sleeve. Thus, initial movement of the cam follower 150, the valve actuator stem 152 the valve stem 70 and valve plug 40 is vertically upwardly without any degree or rotation. When this movement occurs, the interacting cam surfaces of the plug 40 with the slips 48 and 50 induce contracting movement of the slips toward one another. Upward movement of the slips is restricted as explained above by contact of the upper slip extensions with the bonnet 58. Thus, the slip members are moved directly out of sealing contact with the sealing surfaces 54 and 56 by this retracting movement without any rotation that might otherwise erode the sealing members 50 and 52 of the slips.

With the slips retracted from sealing engagement with the valve body surfaces counterclockwise rotation of the outer sleeve member 102 will be continued until the follower pin reaches the vertically oriented section 136 of the cam slots of the outer sleeve. At this position, the follower pin will also be at the smoothly curved transition between the vertically oriented slot section 146 and the inclined slot section 148 of the cam slots of the inner sleeve. Further counterclockwise rotation of the outer sleeve will cause the cam surfaces of the vertically oriented slot section of the outer sleeve to impart rotation to the follower pin, both rotating the actuator stem and plug member 90° to bring the flow port 42 in registry with the flow passages 20 and 22. During this 90° rotation imparted by the vertically oriented cam slot section 136, the inclined intermediate guide slot sections 148 of the inner sleeve member will induce further upward movement of the cam follower pin 150 so that under this condition the valve actuator stem and plug member are undergoing both vertical movement and rotation. After the plug member 40 has been rotated 90° the relative positions of the cam slots of the inner and outer sleeves will be such that the follower pin will be traversing from the vertically oriented slot section of the inner cam slots to the upper inclined slot section 138 and will also be traversing from the intermediate inclined slot section 148 of the cam slot of the inner sleeve to the upper vertically oriented slot section 144. Under this condition, the follower pin will be urged vertically upwardly, thereby moving the plug member 140 to its upper-most position. The upper inclined slot section 138 of the cam slot of the outer sleeve will secure the follower pin against inadvertent downward movement and will thereby stabilize the position of the plug member 40 at its open position within the valve chamber.

The plug member is then closed in reverse manner as explained above simply by rotating the outer sleeve manner in a clockwise direction to first induce rotation to the actuator stem and plug by the vertically oriented cam slot section 136 after the follower pin has been moved from its secured position. Rotational movement of the plug member will have been complete after the follower pin has traversed the inclined intermediate guide slot section 148. Thereafter, the interactive cam slots will impart downward vertical movement to the follower pin to move the plug member downwardly and thus accomplish direct seating of the slip members with the inner sealing surfaces of the valve body.

Thus, the plug and slip assembly is first retracted for unseating by simple vertically upward movement of the plug member and is then rotated 90° to its open position with the slip members in the retracted positions thereof. The slips remain retracted when the plug member is in the open position. During closing movement the plug member is rotated 90° to position the flow port 42 in transverse relation with the flow passages 20 and 22 and is simultaneously moved downwardly to bring the slips into close proximity with the sealing surfaces. After this position has been achieved, the plug member is moved further downwardly without rotation, causing the interacting cam surface of the dove tail grooves 44 and 46 to expand the slip members outwardly into sealing engagement with the surfaces 54 and 56 of the valve body. The plug member is moved downwardly sufficiently to forcible sealing engagement within the body at both the upstream and downstream sides. With the flow passages under pressure, therefore, any leakage of the seal members 50 and 52 may be detected simply by bleeding the valve chamber 18 thus developing a pressure differential across both the upstream and downstream seats. If either of the seals should be damaged or eroded to the extent that sealing capability is impaired, there will be continuing venting of pressurized fluid from the valve chamber. In this event the valve may then be scheduled for maintenance.

In view of the foregoing it is seen that the valve actuator assembly 14 for the lift-turn plug valve 12 is actuated only by rotary movement imparted by a worm gear arrangement or by any other suitable means Thus, the valve actuator mechanism may be of minimal height to thereby insure that this character of valve an valve actuator assembly may be effectively employed under circumstances where minimum height requirements must be met. Further, the valve actuator mechanism of the this invention accomplishes lift-turn capability for unseating and rotating a valve plug and slip assembly in a manner that insures direct movement of the slips away from sealing engagement with the inner surfaces of the valve body. Even further, this valve actuator mechanism effectively imparts rotation to the plug member from its closed position to the open position without permitting erosion of the sealing members by the inner sealing surfaces of the valve body. Thus, it is apparent that this invention is one well adapted to attain all of the objects and features hereinabove set forth, together with other objects and features that are inherent in the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A lift-turn valve actuator for valves incorporating a valve body and a valve seat, said valve body having therein a valve element with a valve stem extending therefrom and being moved first linearly to space the valve element away from the valve seat, then rotated between opening and closed positions and then moved again linearly to seat the valve element against the valve seat, said valve actuator comprising:

(a) a valve actuator housing having an internal actuator chamber disposed therein;

(b) an inner sleeve being disposed in fixed relation with said valve body, said inner sleeve defining opposed cam surfaces forming opposed guide slots each having upper and lower substantially vertically oriented guide slot sections and an intermediate inclined guide slot section, said inner sleeve forming an actuator stem passage centrally thereof;

(c) an outer sleeve being rotatably disposed about said inner sleeve and positioned within said actuator chamber, said outer sleeve defining cam surfaces forming opposed cam slots each having upper and lower inclined sections and a substantially vertically oriented intermediate section together with smoothly curved transition sections therebetween, said outer sleeve receiving a driving means about a portion thereof and being disposed within a portion of said actuator chamber for operable coupling to an extended driving means;

(d) an actuator stem for connection in nonrotatable relation with said valve stem and being disposed for rotary and linear movement within said actuator stem passage;

(e) cam follower means extending transversely from opposed sides of said actuator stem and being movably received within respective guide slots and cam slots;

(f) means for restraining relative linear movement of said outer sleeve;

(g) means restraining rotary and linear movement of said inner sleeve; and (h) said internal and external driving means imparting rotary movement to said outer sleeve thus inducing interaction of said cam slots and guide slots with said cam follower means for imparting movement to said cam follower means and said actuator stem, said lower vertically oriented sections of said guide slots of said inner sleeve and said lower inclined sections of said cam slots of said outer sleeve cooperatively inducing linear movement to said cam follower means and actuator stem during a first rotary component of movement of said outer sleeve in one direction said intermediate inclined sections of said guide slots and said vertically oriented intermediate sections of said cam slots cooperatively inducing simultaneous rotary and linear movement to said cam follower means and said actuator stem during a second component of rotary movement of said outer sleeve inn said one direction, whereby said cam follower means and actuator stem are initially moved linearly and then moved linearly and rotationally during rotation of said outer sleeve to the open position, and then moved linearly and rotationally during rotation of said outer sleeve to said closed position and then again moved linearly.

2. The lift-turn actuator of claim 1, including:

(a) actuator housing means forming an actuator chamber therein and adapted for mounting to a valve body structure; and (b) drive means being supported by said actuator housing and being coupled in rotary driving relation with said outer sleeve for rotation of said outer sleeve within said actuator chamber.

3. The lift-turn actuator of claim 2, wherein said drive means comprises:

a rotary driven gear being disposed in non-rotatable relation with said outer sleeve.

4. The lift-turn actuator of claim 1, wherein:

said inclined sections of said cam slots of said inner and outer sleeves are oppositely inclined and when relatively moved rotationally induce simultaneous linear and rotational movement to said cam follower means and said actuator stem.

5. The lift-turn actuator of claim 1, wherein:

said cam surfaces of said lower inclined section of said guide slots and said cam surfaces of said lower vertically oriented sections of said cam slots cooperating to impart said first component of linear movement to said cam follower means and actuator stem from the lowermost positions thereof upon a first segment of rotation of said outer sleeve in one direction.

6. The lift-turn actuator of claim 5, wherein:

said cam surfaces of said intermediate vertically oriented sections of said cam slots and said cam surfaces of said intermediate inclined sections of said guide slots cooperate to impart simultaneous upward movement and rotary movement to said follower means and said actuator stem during a second segment of rotation of said outer sleeve inn said one direction from said position thereof at the completion of said first segment of rotation of said outer sleeve in said one direction.

7. The lift-turn actuator of claim 6, wherein:

said cam surfaces of said upper inclined segments of said cam slots and said cam surfaces of said upper vertically oriented sections of said guide slots cooperatively induce upward vertical movement to said cam follower means and actuator stem from the positions thereof at the completion of said second segment of rotational movement of said outer sleeve during a third segment of rotational movement of said outer sleeve in said one direction.

8. The lift-turn actuator of claim 1, wherein:

(a) said actuator stem defines a transverse bore extending therethrough; and (b) said cam follower means being a pin member positioned within said transverse bore and having opposed ends thereof extending beyond each side of said actuator stem.

9. A lift-turn valve actuator for valves incorporating a valve body having a valve seat therein, said valve body having therein a valve element with a valve stem extending therefrom and being moved first linearly to space the valve element away from the valve seat, then rotated between opening and closed positions and then moved again linearly to seat the valve element against the valve seat, said valve actuator comprising:

(a) actuator housing means being attached to a valve body structure and forming an actuator chamber therein;

(b) an outer sleeve member being disposed for rotation within said actuator chamber said outer sleeve defining opposed cam slots each having upper and lower inclined sections and a substantially vertically oriented intermediate section together with smoothly curved transition sections therebetween said outer sleeve receiving a driving means about a portion thereof and being disposed within a portion of said actuator chamber for operative coupling to an external driving means;

(c) thrust shoulder means being defined by said actuator housing means ana securing said outer sleeve against linear movement relative to said actuator housing;

(d) an inner sleeve being secured in fixed relation with said actuator housing and having a cylindrical portion thereof disposed within said outer sleeve, said inner sleeve defining opposed cam surfaces forming opposed guide slots each having upper and lower substantially vertically oriented guide slot sections and an intermediate vertically inclined guide slot section, said inner sleeve further forming an actuator stem passage therein;

(e) an actuator stem having a portion thereof disposed for rotary and linear movement within said stem passage;

(f) cam follower means extending transversely from opposed sides of said actuator stem and being movably received within respective guide slots and cam slots; and (g) drive gear means being disposed within said actuator chamber of said housing means and being connected in rotary driving relation about said outer sleeve for operative coupling to an external driving means thus inducing relative rotation of said inner and outer sleeves for interaction of said cam surfaces of said cam slots and guide slots with said cam follower means for imparting sequential rotary and linear movement top said cam follower means and aid actuator stem, upon rotary movement of said outer sleeve in one direction with said cam follower means at the lowermost position thereof said cam surfaces interacting with said cam follower means and inducing linear movement to said cam follower means and actuator stem during a first segment of said rotation inducing simultaneous rotary and upward linear movement to said cam follower means during a second increment of said rotary movement whereby said cam follower means and said actuator stem are initially moved linearly and then moved linearly and rotationally during rotation of said outer sleeve to the open position and then moved linearly and rotationally during rotation of sad outer sleeve to said closed position and then again moved linearly.

10. The lift-turn actuator of claim 9, wherein:
said inclined sections of said cam slots of said inner and outer sleeves are oppositely inclined and when relatively moved rotationally induce simultaneous liner and rotational movement to said cam follower means and said actuator stem.

11. The lift-turn actuator of claim 9, wherein:
said cam surfaces of said lower inclined sections of said guide slots and said cam surfaces of said lower vertically oriented sections of said cam slots cooperate to impart said first component of linear movement to said cam follower means and actuator stem from the lowermost positions thereof upon a first segment of rotation of said outer sleeve in one direction.

12. The lift-turn actuator of claim 11, wherein:
said cam surfaces of said intermediate vertically oriented sections of said cam slots and said cam surfaces of said intermediate inclined sections of said guide slots cooperate to impart simultaneous upward movement and rotary movement to said follower means and said actuator stem during a second segment of rotation of said outer sleeve in said one direction from said position thereof at the completion of said first segment of rotation of said outer sleeve in said one direction.

13. The lift-turn actuator of claim 12, wherein:
said cam surfaces of said upper inclined segments of said cam slots and said cam surfaces of said upper vertically oriented sections of said guide slots cooperatively induce upward vertical movement to said cam follower means and said actuator stem from the positions thereof at the completion of said second segment of rotational movement of said outer sleeve during a third segment of rotational movement of said outer sleeve in said one direction.

* * * * *